«12» United States Patent
Bhabbur et al.

(10) Patent No.: US 10,523,675 B2
(45) Date of Patent: Dec. 31, 2019

(54) REMOTE DIRECT MEMORY ACCESS AUTHORIZATION

(71) Applicant: CA, Inc., Islandia, NY (US)

(72) Inventors: Gyaneshwar Bhabbur, Secunderabad (IN); Nirupama Behera, Sambalpur (IN)

(73) Assignee: CA, Inc., Islandia, NY (US)

( * ) Notice: Subject to any disclaimer, the term of this patent is extended or adjusted under 35 U.S.C. 154(b) by 234 days.

(21) Appl. No.: 15/806,926

(22) Filed: Nov. 8, 2017

(65) Prior Publication Data

US 2019/0141041 A1 May 9, 2019

(51) Int. Cl.
*H04L 29/06* (2006.01)
*H04L 9/06* (2006.01)
*H04L 9/32* (2006.01)

(52) U.S. Cl.
CPC ............ *H04L 63/10* (2013.01); *H04L 9/0643* (2013.01); *H04L 9/3213* (2013.01); *H04L 9/3226* (2013.01); *H04L 9/3228* (2013.01); *H04L 63/06* (2013.01); *H04L 63/20* (2013.01); *H04L 63/0838* (2013.01); *H04L 2463/082* (2013.01)

(58) Field of Classification Search
CPC ......... H04L 63/10; H04L 63/06; H04L 63/20; H04L 63/0838; H04L 9/0643; H04L 9/3213; H04L 9/3226; H04L 9/3228; H04L 2463/082
USPC ........................................................ 713/168
See application file for complete search history.

(56) References Cited

U.S. PATENT DOCUMENTS

| 7,971,236 | B1 | 6/2011 | Lentini | |
| 9,197,629 | B2 | 11/2015 | McBrearty et al. | |
| 9,213,609 | B2* | 12/2015 | Hansen | G06F 11/2097 |
| 2004/0225719 | A1* | 11/2004 | Kisley | G06F 3/061 |
| | | | | 709/212 |
| 2005/0198113 | A1* | 9/2005 | Mohamed | H04L 67/1097 |
| | | | | 709/203 |
| 2007/0078940 | A1* | 4/2007 | Fineberg | G06F 13/28 |
| | | | | 709/216 |
| 2007/0175978 | A1* | 8/2007 | Stambaugh | G06Q 20/32 |
| | | | | 235/379 |

(Continued)

OTHER PUBLICATIONS

'Basic Flow Control for RDMA Transfers,' http://www.hpcadvisorycouncil.com/pdf/vendor_content/basic-flow-control-for-rdma-transfers.pdf, Jan. 16, 2013, pp. 1 to 9.

(Continued)

*Primary Examiner* — Michael S McNally
(74) *Attorney, Agent, or Firm* — Pillsbury Winthrop Shaw Pittman, LLP

(57) ABSTRACT

Provided is a process of determining whether remote direct memory access requests are authorized, including: receiving a request to authorize a remote direct memory access request (RDMA) session between a first computing device and a second computing device; receiving a user credential from the second computing device; receiving a computing-device attribute indicator based on a plurality attributes of the second computing device; accessing access-control criteria corresponding to the received request in an access-control policy repository; and determining based on the accessed access-control criteria, the computing-device attribute indicator, and the user credential, to authorize the requested RDMA session.

20 Claims, 4 Drawing Sheets

(56) References Cited

U.S. PATENT DOCUMENTS

2013/0347092 A1* 12/2013 McBrearty .............. G06F 21/31
726/9

OTHER PUBLICATIONS

'Building an RDMA-Capable Application with IB Verbs,', http://www.hpcadvisorycouncil.com/pdf/building-an-rdma-capable-application-with-ib-verbs.pdf, Aug. 21, 2010, pp. 1 to 12.
'RDMA—what does it mean to MPI applications?,' High Performance Computing Networking, http://blogs.cisco.com/performance/rdma-what-does-it-mean-to-mpi-applications, Jul. 16, 2011, pp. 1 to 5.
'Direct Data Placement Protocol (DDP) / Remote Direct Memory Access Protocol (RDMAP) Security,' https://tools.ietf.org/html/rfc5042, Oct. 2007, pp. 1 to 53.
'Applicability of Remote Direct Memory Access Protocol (RDMA) and Direct Data Placement (DDP),' https://tools.ietf.org/html/rfc5045, Oct. 2007, pp. 1 to 23.
'Verbs programming tutorial,' OpenSHMEM, 2014, Mellanox Technologies, pp. 1 to 115.

* cited by examiner

REMOTE DIRECT MEMORY ACCESS AUTHORIZATION

CROSS-REFERENCE TO RELATED APPLICATIONS

No cross reference is presented at this time.

BACKGROUND

1. Field

The present disclosure relates generally to cybersecurity and, more specifically, to remote direct memory access authorization.

2. Description of the Related Art

Remote direct memory access (RDMA) is a technique for relatively low-latency data transfer between computing devices. Often, sending data from one computing device to another is slowed by the time taken to advance the data through networking stack of a kernel of an operating system of the sending or receiving computing device, or both. Further, processing data through the networking stack of the kernel can cause context switches that slow other processes executing on the sending or receiving computing device. To mitigate these issues, RDMA may be used to transfer data directly between a network adapter (e.g., a network interface card or integrated network adapter) and memory on the sending or receiving side, or both. This transfer may be completed without a context switch in the central processing unit, and without waiting for exchanges to be processed by a networking stack of a kernel to be routed to memory addresses assigned to an application to which the access request pertains.

SUMMARY

The following is a non-exhaustive listing of some aspects of the present techniques. These and other aspects are described in the following disclosure.

Some aspects include a process of determining whether remote direct memory access requests are authorized, the process including: receiving, with one or more processors, via a network, a request to authorize a remote direct memory access request (RDMA) session between a first computing device and a second computing device, wherein: the RDMA session implements an RDMA protocol by which data is made accessible in system memory of the first computing device to the second computing device, the data is made accessible through direct memory access to the system memory by firmware executing on a network adapter of the first computing device responsive to access requests received from the second computing device by the network adapter, and the direct memory access is performed by the first computing device without corresponding access requests first being processed by a networking stack of a kernel of an operating system of the first computing device; receiving, with one or more processors, via a network, a value demonstrating possession of a user credential, the value demonstrating possession of the user credential being received in association with the request to authorize the RDMA session, the user credential being supplied via an application executing on the second computing device; receiving, with one or more processors, via a network, a computing-device attribute indicator based on a plurality of attributes of the second computing device, wherein at least one attribute among the plurality of attributes is an immutable value at least partially identifying hardware of the second computing device; accessing, with one or more processors, access-control criteria corresponding to the received request in an access-control policy repository, wherein: the access-control policy repository contains criteria corresponding to a plurality of different users including a user authorized to be authenticated with the user credential, the access-control policy repository contains criteria indicating that at least some pairs of computing devices on a network are not permitted to conduct an RDMA session, and the access-control policy repository contains criteria indicating that at least some combinations of users and pairs of the computing devices are not permitted to conduct an RDMA session; determining, with one or more processors, based on the accessed access-control criteria, the computing-device attribute indicator, and the value demonstrating possession of the user credential, to authorize the requested RDMA session; and in response to the determination, causing, with one or more processors, an authentication token to be provided to the first computing device, the authentication token being configured to cause the first computing device to permit the second computing device to conduct an RDMA session with the first computing device.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
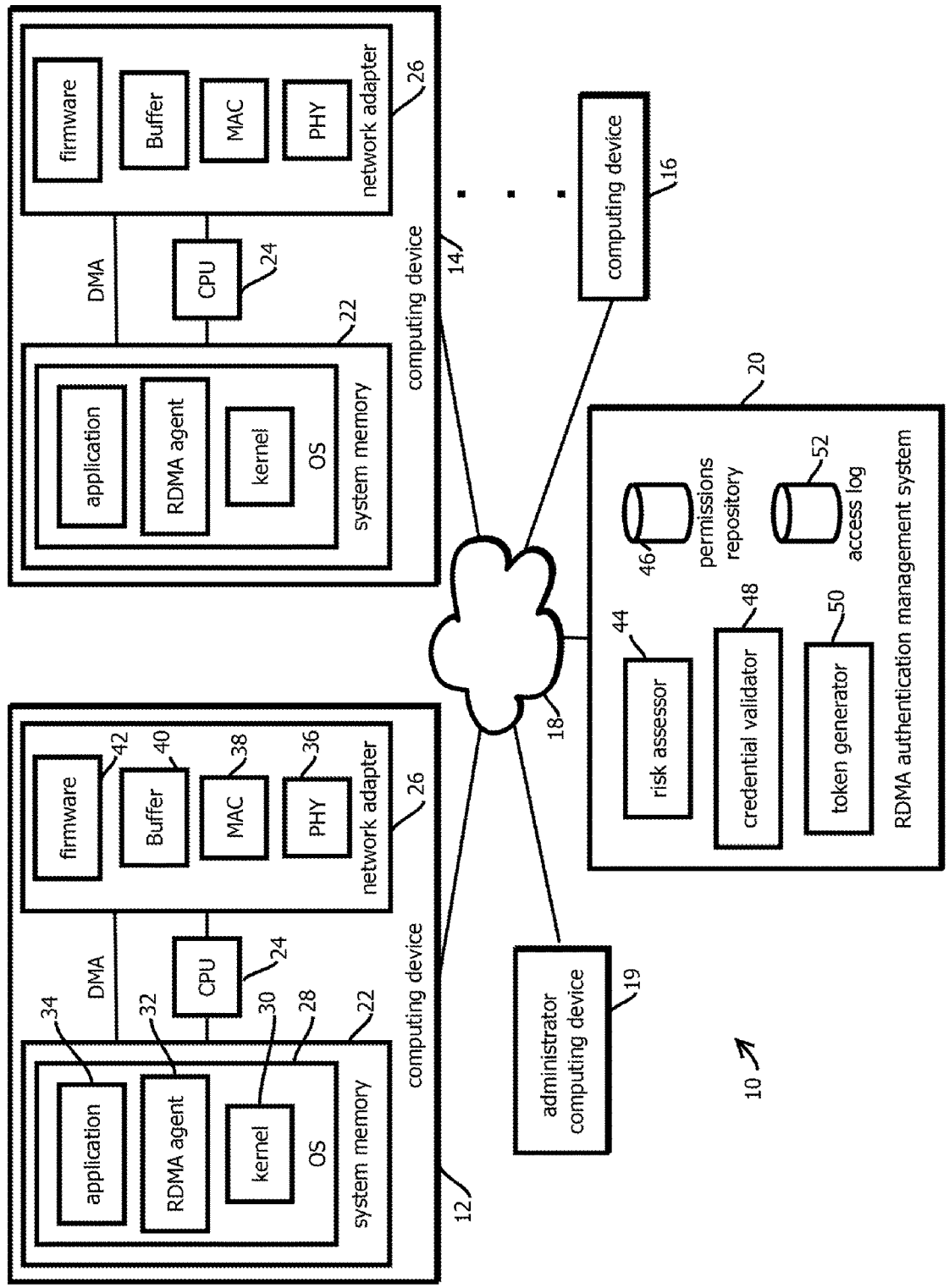
FIG. 1 is a logical and physical architecture block diagram showing an example of a computing environment in which RDMA sessions may be authorized in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of cybersecurity and high performance distributed computing. Indeed, the inventors wish to emphasize the difficulty of recognizing those problems that are nascent and will become much more apparent in the future, should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As noted above, Remote Direct Memory Access (RDMA) often provides relatively fast read/write access to remote memory (relative to traditional approaches engaging the kernel's networking stack), by bypassing the CPU, and avoiding the need to copy data between application memory and data buffers in the operation system (e.g., of a network adapter driver). However, there is a need to increase security of the data exchange between the participating computing devices (also referred to as nodes or peers). The intensity of this need is increasing relatively quickly due to broader deployment of RDMA with recent Ethernet based implementations.

Certain approaches to securing RDMA access are lacking. For instance, some approaches allow RDMA sessions to be established and merely secure the data being exchanged while in transit. This leaves an adversary with an attack surface in which additional functionality of a network adapter and RDMA driver is potentially exposed. Some approaches merely implement pass phrases to determine whether to establish a session. These approaches, however, are often vulnerable to phishing or brute force attacks that reveal the pass phrase and let an adversary use the pass phrase from a computing device they control on a network. Some approaches require changes to the RDMA standard described in the most current, finalized iWarp and RoCE standards as of the filing date of the present application, the contents of which are hereby incorporated by reference. For instance, some techniques require new verbs be added to the RDMA standard, rendering existing tooling unusable in some cases. (The discussion of these issues should not be read as a disclaimer of techniques that suffer from these problems, e.g., to a lesser degree than prior art approaches, or to a different subset of these problems than prior art approaches, and some embodiments may address other problems described herein or that will be apparent to one of ordinary skill in the art reading this disclosure.)

Some embodiments address authentication and authorization prior to session establishment, e.g., before the actual RDMA data exchange, while underlying communication may be consistent with the RDMA protocol. To this end and others, some embodiments may implement multi-factor authentication and risk-based assessment of requested sessions, in some cases, with relatively fine grained, centralized access control and logging. Thus, some embodiments may include the following:
  a. Multi-Factor authentication;
  b. Risk Evaluation based on the risk data elements collected on the computing device;
  c. Fine grained access control (e.g., at the level of individual users or computing-device pairs) based on user specific configuration, system risk data collection, user based source/destination combinational access privileges, etc.; and
  d. Administrative capability to manage the users, credentials, user level access controls.

In some embodiments, authorized sessions may be issued an authentication token. Some embodiments are expected to enhance RDMA communication security by having a receiver agent configured to validate an authentication token prior to serving the request for RDMA read or write operation. Some embodiments may perform additional validation of the users/agents during RDMA read and write operations. Some embodiments may encrypt or cryptographically sign RDMA exchanged data using user's private key or dynamic passwords, such as a one-time password (e.g., a server generated one-time password, a Time-based One-Time Password algorithm (TOTP) described in RFC 6238, a HMAC (Hash-based message authentication code)-based one-time password HOTP, as described in RFC 2104), or the authentication token.

Some embodiments are expected to enhance security and increase the likelihood that only the legitimate user with appropriate privileges can perform the RDMA read and write operations between source and destination endpoints/agents combinations. (For instance, user-credential-based authentication might be successful but risk metrics may indicate the user does not have enough privileges to perform the operation.) To manage permissions and credentials, users may have corresponding accounts, as well as access privileges, specified in policies used to determine whether to initiate the data exchanges between the parties/agents, which can be managed by an administrator in some cases. In some cases, authorization is not limited to the RDMA read and write operations per source/destination combination and, also, can be extended to the system/risk data collection on which access to be granted, which is not to suggest that any other description is limiting. In some cases, data exchanged may be encrypted, e.g., with Secure Sockets Layer (SSL) or Transport Layer Security (TLS) based approaches.

The multi-factor authentication mechanism may be based on any of a variety of techniques, including the following:
  a. Static Password authentication.
  b. Public key infrastructure (PKI) based authentication, e.g., where user signs the challenge with the private key and the server verifies the signed challenged using the user's public key.
  c. Dynamic password authentication, such as standard One-Time passwords, mobile generated on-time password (e.g., TOTP or HOTP).
  d. The CA Strong Authentication product available from CA, Inc. of Islandia, N.Y. may be configured in accordance with the techniques herein to implement user credentials, authentication, and management.

Risk data attributes may be based on hardware and software fingerprint of a computing device, such as machine information collected by a native application executing on that machine, like the RDMA agents described below. Some embodiments of the native application may be configured to generate and send a cryptographic hash from the selected risk data attributes (e.g., a different hash for each, or one or more hashes based on a combination, such as a single hash based on each). Examples of such risk data attributes include:
  a. A medium access control (MAC) identifier.
  b. A global unit identifier (GUID).
  c. A volume identifier of a persistent storage device, like a hard drive or solid state drive.

d. A processor (e.g., a central processing unit (CPU)) identifier.
e. CPU attributes, like cache size, speed, cores, etc.
f. Basic input/output system (BIOS) or Unified Extensible Firmware Interface (UEFI) attributes, like version number, maker, or configurations (e.g., boot drive);
g. Mother board attributes, like clock speed, PCI lanes, memory channels, etc.
h. Random access memory (RAM) attributes, like amount, the presence of error correction, clock speed, etc.
i. Internet Protocol (IP) address.
j. Host/domain names etc.
k. Operating system (OS) attributes, like maker, name, version, installed applications, or configuration.

Risk may be assessed with a variety of techniques. Some embodiments may map user accounts to the hash of the computing device and detect mismatches indicative of an attack, e.g., where a user's credentials are used on a different computing device from that which they have previously used. In some cases, risk evaluation may be performed by calculating a risk score based on collected risk data that is compared against previous or authorized risk data attributes, and the score may be compared against a configuration threshold to determine responsive actions.

In some embodiments, evaluation of risk may result in any of a variety of outcomes, such as the following:
a. Allow—Allows RDMA read/write operation from the risk evaluated machine.
b. Deny—Deny RDMA read/write operation from the risk evaluated machine.
c. Increase Authentication—Additional authentication to be performed. The user may be challenged to authenticate using any of the methods such as one-time password (OTP), Mobile generated OTP (HOTP/TOTP), etc.
d. Warning—Appropriate warning message is displayed and logged into the audit system/database.

In some embodiment, some aspects of risk analysis may be performed or supplemented with the CA Risk Authentication engine, available from CA Inc. of Islandia N.Y., properly configured to implement the techniques described herein.

Some embodiments may provide system administrators relatively fine-grained access control for RDMA sessions. In some cases, users may be allowed to access the RDMA read/write operations based on the configured user access privileges. Administrator computing devices may be sent a user interface by which an administrator may grant or deny access to RDMA read or write operations to configured source and destination end points or agents. This authorization approach is expected to further enhance the RDMA read/write operations security. To this end, some embodiments may provide user interfaces or application program interfaces related to, and give effect to, the following features:
a. User and credentials management.
b. Risk data collection and evaluation management.
c. Relatively fine grained access control management to configure per user access between source and destinations.
d. Auditing and reporting.

In short, RDMA provides some security measures, but this security is expected to be enhanced with the presently described authentication mechanisms along with authorization at user and source/destination combination level. To this end or others, some embodiments may implement the following features:
a. Authentication mechanisms, such as Standard One-Time Password, User PKI based, Risk evaluation in addition to verification of the authentication token by the participating agents (sender/receiver) during RDMA read and write operations.
b. Authentication tokens generated based on the successful authentication and to be used in the subsequent data exchanges, which is expected to be useful to reduce a hacker's ability to push malicious data to the remote peer, by impeding or preventing impersonating, man-in-middle, spoofing, stream hijacking, and other attacks.
c. Enforcing limits on the enrolled peer/user participate in the data exchange within an RDMA session.
d. Enforcing limits preventing devices with higher risk being allowed to participate in the data exchange within an RDMA session.
e. Enforcing limits on which users with authorized data exchanges between the designated source and destination endpoints/agents are allowed to perform RDAM read and write operations.
f. Enforcing limits on permissible and lower risk devices being allowed to perform RDMA read and write operations.
g. Enforcing limits on computing devices or users with being allowed to perform RDMA read and write operations based on the risk data collection.
h. Centralized user, credentials, and access control management.
   i. Credentials (OTP/PKI) life cycle management.
      1. Enrollment
      2. Authentication
         a. Lock/Unlock credentials
         b. Activate/disable credentials
         c. Reset credentials
   ii. Risk data collection and evaluation management
      1. User and device policy management
      2. Risk data elements weightage configuration
   iii. Fine grained access control management
      1. Authorization based on user and device mapping.
      2. Authorization based on user and source/destination combination The present techniques may be implemented in a variety of use cases, including the following:
a. Application server logging to remote log server.
b. Consolidation of data/logs from various remote application servers.
c. PowerShell cmdlet to access remote memory data.
d. Distributed cache cluster management.

In some implementations, as described in greater detail with reference to FIG. 2 below, an access control based process like the following may be executed:
a. Client/Peer initiates the data exchange.
b. Client/Peer send the user details along with the source and destination details to the server for access privileges check.
c. Server validates if the user has the appropriate privileges to perform the requested operation between the source and destination.
d. Based on the response from the server, client/peer may initiate the data exchange with appropriate access token or else terminates the transaction.

e. Receiver client/peer may validate the user access privileges based on the access token or revalidation with the server.

f. Upon determining the user has appropriate access rights, the operation may be allowed or else transaction is terminated.

In some implementations, alternatively or additionally, as described in greater detail with reference to FIG. 2 below, a risk control based process like the following may be executed:

a. Client/Peer initiates the data exchange.

b. Client/Peer communicates with the server, to validate the user access privileges to perform the operation.

c. Upon determining the user has appropriate access, a transaction may be initiated or else terminated by the client/peer.

d. Client/peer collects system and risk data that may be sent to the server for risk evaluation.

e. Server performs risk evaluation based on various risk data parameters including peer machine/OS details against configured policies.

f. Based on the risk evaluation, user may be challenged to provide OTP (Mobile generated OTP or server sent OTP).

g. Client/Peer may send OTP provided by the user to the server.

h. Server may validate the OTP and if (e.g., in response to determining that it is) valid then allow the client for data exchange.

In some implementations, alternatively or additionally, as described in greater detail with reference to FIG. 2 below, a OTP-multifactor and risk control based process like the following may be executed:

a. Client/Peer initiates the data exchange.

b. Client/Peer provides a mobile generated OTP.

c. Client/Peer communicates with the server to validate the user access privileges to perform the operation.

d. Upon determining that the user has appropriate access, the transaction may be initiated or else terminated by the client/peer.

e. Server may verify the OTP and, upon verification, responds with the authentication token.

f. Client may send the data along with authentication token.

g. Server may then validate the authentication token and based on whether (e.g., only if) the authentication token is valid then may receive the data else terminate the data exchange.

In some implementations, alternatively or additionally, as described in greater detail with reference to FIG. 2 below, a PKI based-multifactor and risk control based process like the following may be executed:

a. Client/Peer initiates the data exchange.

b. Client/Peer communicates with the server to validate the user access privileges to perform the operation.

c. Upon determining that the user has appropriate access, the transaction may be initiated or else terminated by the client/peer.

d. Client/Peer may receive a PKI challenge and sign the challenge with a private cryptographic key and then initiate the data exchange with signed challenge.

e. Server may verify the signed challenge and, upon verification, send the authentication token to the client.

f. Client may then send the data along with the authentication token.

g. Server may then validate the authentication token and based on whether (e.g., only if) the authentication token is valid then may receive the data else terminate the data exchange.

FIG. 1 shows an example of a computing environment 10 in which the above-describe techniques, or subsets thereof, may be implemented. In some embodiments, the computing environment 10 may include a plurality of networked computing devices 12, 14, and 16 connected to one another via a network 18. In some embodiments, the network 18 may be a private network, such as a private Ethernet-based or InfiniBand-based network. In some embodiments, the network 18 includes other networks, such as the public Internet. In some embodiments, the computing environment 10 further includes an RDMA authentication management system 20 and an administrator computing device 19. In some embodiments, the computing devices 12, 14, and 16, such as pairs of the computing devices, may exchange data via RDMA sessions, and in some cases, the RDMA authentication management system 20 may manage user credentials, risk-based assessments, and policies by which determinations are made to permit RDMA sessions. In some embodiments, the RDMA authentication management system 20 may be configured to be responsive to commands from the administrator computing device 19, for instance, commands entered into user interfaces sent to the administrator computing device 19 by the RDMA authentication management system 20. And in some cases, the administrator computing device 19 may access alarms and logged events indicative of RDMA sessions stored by the RDMA authentication management system 20.

Three computing devices 12, 14, and 16 are illustrated as nodes of a network in which RDMA sessions may be established. However, embodiments are expected to include substantially more computing devices, particularly in many commercial deployments, which may include more than 10, more than 100, or more than 1000 computing devices. RDMA sessions may be point-to-point, between respective pairs of computing devices, or in some cases, RDMA sessions may include a broadcast that conveys the same data to multiple computing devices or multiple hops across multiple computing devices.

RDMA is often used to transfer data relatively quickly between applications executing on different computing devices, compared to transfers involving a networking stack of an operating system of an accessed computing device. Often, access requests, such as read or write operations, are processed through a networking stack of a kernel of the computing device. This often causes the access request to be delayed and the accessed computing device to performing at a slower rate. Without direct memory access, often, upon receiving a quantum of data, such as a packet or frame, a network adapter on the receiving computing device may write the data from a buffer of the network adapter to system memory and then send an interrupt to a central processing unit (CPU) of the receiving computing device. The interrupt may cause the central processing unit to execute an interrupt handler routine that calls a driver executing on the CPU. That driver may load the data from the system memory (e.g., from regions allocated to a driver of the network adapter) into the kernel's networking stack. The kernel's networking stack may then route (e.g., by copying or by reference) the data to a corresponding application, such as an application registered to receive data on a given port number of the computing device. These operations following the interrupt may cause a context switch for the CPU, which may impose substantial delays. To reduce the frequency of such delays, RDMA may be used to write data directly from the network adapter to the system memory (for instance, to an area of the system memory outside of that which is allocated to a driver of the network adapter, such as an area of system memory allocated to an application being accessed) or read data directly from system memory (for instance, in the aforementioned areas assigned to an application that is different from the network adapter driver). In some cases, the computing device may include a direct memory access controller that coordinates direct memory access. In some embodiments, RDMA may be referred to as a form of zero copy networking. In some cases, RDMA may be achieved without the accessed data passing through the kernel's networking stack or causing an interrupt or context switch for the CPU in the course of effectuating the requested access. This is not to suggest that subsequent interrupt, context switches, or exchanges via a kernel's networking stack may not occur later, for instance, upon completing a sequence of RDMA operations.

In some embodiments, RDMA sessions may include or be based upon protection domains in memory of the accessed computing device. For instance, areas of random-access memory within an address space of the operating system, in some cases within continuous ranges of virtual addresses or physical addresses. In some embodiments, an RDMA session may include registering a remote computing device to access a portion of a protection domain, and the remote computing device may be prevented from accessing areas outside of the registered area and permitted to access memory within the registered area.

In some embodiments, RDMA sessions may cause an RDMA driver executing on one or both computing devices in a session to register a virtual memory region having a contiguous memory block as being assigned to (and reserved for) the session. This may allow for the registering of various memory buffers in the process' virtual space. In some instances, the process of registering the memory region may cause the computing device to grant permission for local operations (e.g. local read, write or bind) and remote operations (e.g. remote read or write or atomic operations). If the remote write or atomic permission is enable (e.g., during registration), local writes may be enabled too. In some instances, the same memory region may be registered more than once with different permissions. Once a successful memory registration is completed, in some embodiments, two keys are generated: a local key (lkey) and a remote key (rkey). The two keys may be used in the memory region as (or once) a work request is performed. In a virtual memory region, virtual memory pages present in RAM can be swapped, and as a result, in some cases the memory pages are pinned, which is expected to afford relatively low latency access. Address translation to a physical address takes time to perform. In some instances, the address translation may be cached, reducing the amount of time to perform various work requests.

In some embodiments, RDMA sessions may include a data transfer model, which may include requests that the hardware should perform, e.g., work requests. Often these work requests, such as send, receive or a combination thereof, are initiated, labeled as outstanding, and completed. In some cases, when a work request is labeled as outstanding, send buffers to be reused or freed may be restricted, and the content of receive buffers may be inaccessible. Once the work request is completed, information about the ended work request, e.g., type, opcode, amount of data sent/received, may be generated and logged.

Work requests containing tasks in RDMA sessions may contain work queues in which the hardware schedules tasks, e.g. a send or receive queue, an operation which may be referred to as posting a work request. In some implementations, the execution order of the work request may be guaranteed within the same work queue, (e.g., by enforcing a first-in-first-out (FIFO) rule). In some cases, there may be no execution order imposed between different work queues. In some cases, a send queue may execute the sending of messages and generate a send request. The send request may include how to use the data, which memory buffers to use to send or receive data depending on the opcode, and how much data to send. The process of adding a send request to a send queue is referred to as posting a send request. The send request may end with a work completion status. In some instances, a receive queue may execute the receiving of incoming messages and generate a receive request. The receive request may specify which memory buffers are to be used during the request, depending on the opcode. The process of adding a receive request to a send queue is referred to as posting a receive request. The receive request ends with a work completion status. The receive queue may send data in response to the work completion, depending on the opcode. In some instances, the hardware may execute a queue pair which includes both a send queue and receive queue. In a queue pair, each and every queue is independent of the other queue and may be associated with a partition key.

In some embodiments, data sent over RDMA may be conveyed over various types of networks, such as Ethernet networks or InfiniBand networks. Examples of Ethernet-based implementations of RDMA include Internet Wide Area RDMA Protocol (iWARP) and RDMA Over Converged Ethernet (RoCE). In the instance of iWARP, RDMA may be provided over Stream Control Transmission Protocol (SCTP) and Transmission Control Protocol (TCP). In the instance of RoCE, encapsulation of RDMA packets may be over Ethernet/IP networks.

In some embodiments, each of the computing devices on the network 18 may include the features of the computing device 12 described by way of example. In some embodiments, the computing device 12 and the other computing devices on the network 18 may be implemented with a computing device like that described below with reference to FIG. 4. In some embodiments, the computing device 12 may include system memory 22, a central processing unit 24, and a network adapter 26. In some embodiments, the system memory 22 may include dynamic random-access memory (or in some cases nonvolatile memory) that holds program state of executing applications and instructions, such as program code, by which those applications are implemented, along with instructions by which an operating system and agent described below are implemented. In some embodiments, the system memory 22 includes random-access memory on a memory bus, such as a DDR3 or DDR4 memory bus on a motherboard of the computing device 12 and coupled to a memory controller of the central processing unit 24, for instance, via one or more channels. In some embodiments, traces of these channels may correspond to binary digits in physical addresses, such as addresses encoded in binary values sent on an address bus portion of the memory bus, which in some cases may be mapped by an operating system to various ranges of virtual addresses. Such virtual addresses may be assigned to different applications, in some cases with each application executing on an OS having a different virtual address space that begins with the same virtual address and corresponds to a different physical address.

In some embodiments, the central processing unit may include a program counter that is incremented with each successive instruction of an application or operating system executed, various cores by which various processes are executed, and a memory controller by which the central processing unit interfaces with system memory 22. In some embodiments, the central processing unit 24 may couple to the network adapter 26 via a PCI Express (Peripheral Component Interconnect Express) bus or various other types of buses on a motherboard. In some cases, the network adapter 26 may be integrated with the central processing unit and, in some cases, with the system memory 22, for example, in a system-on-a-chip.

In some embodiments, the network adapter 26 may interface between a network driver executed an OS of the computing device 12 and a physical media that connects the computing device 12 to the network 18, such as Ethernet or in InfiniBand networks.

In some embodiments, the system memory 22 includes an operating system 28, such as the Windows™ operating system, a UNIX™ operating system, a version of the Linux™ operating system, or a version of the z/OS™ operating system. In some embodiments, the operating system may include a kernel, which may be instantiated with instructions in a secure region of an address space of system memory and may interface between applications within a user space of the operating system and hardware of the computing device. In some embodiments, a kernel space 30 or user space of the operating system 28 may further include an RDMA agents 32 which may include or interface with an RDMA driver by which an application 34 executing within a user space of the operating system effectuates RDMA access requests. In some embodiments, the operating system 28 may include a plurality of applications that are executing, for example in different threads or processes, and a plurality of different applications may be interfacing via the RDMA agent 32 to various other computing devices. In some embodiments, applications may interface with other computing devices concurrently via RDMA and via non-RDMA methods, for instance via networking stacks in kernels of receiving computing devices.

In some embodiments, the network adapter 26 may be a separate physical card, chip, or block of an integrated circuit relative to the central processing unit 24 and the system memory 23. In some embodiments, the network adapter 26 includes a PHY module 36 configured to transmit frames on a physical medium and manage contention with the physical medium, such as a cat five cable or coaxial cable. In some embodiments, a network adapter may include a medium access controller 38 configured to manage contention with other computing devices sharing the physical medium. In some embodiments, network adapter 26 may be configured to implement gigabit, or faster, Ethernet or InfiniBand. In some embodiments, network adapter 26 may be configured to implement point-to-point full-duplex connections via the computing device 12 on the physical media with an adjacent node on the physical media, such as a network switch, router or other computing device. In some embodiments, data sent or received via the network adapter 26 may be stored in a buffer 40, for example in either a send buffer or receive buffer, in which each may be a first in first out buffer, such as a ring buffer. In some embodiments, firmware 42 executing on the network adapter 26 may transfer data between the buffer 40 and the system memory 22, either to regions of system memory 22 allocated to a network adapter driver, e.g., with direct memory access, or to regions of system memory 22 allocated to an application 34, e.g., remote direct memory access. Firmware 42 may execute outside of the central processing unit 24 and may communicate with the central processing unit 24 via various interrupts sent to the central processing unit 24, which may cause the central processing unit 24 to execute various interrupt handlers that cause the network adapter driver to take subsequent operations.

In some embodiments, the RDMA authentication management system 20 may be configured to execute a process described below with reference to FIG. 3. In some embodiments, the RDMA authentication management system may manage credentials, assess risk, store and effectuate policies, by which authorization for RDMA sessions are determined, access requests are logged, and changes are made to policies to facilitate auditing and alarms. In some embodiments, the RDMA authentication management system 20 may be implemented on a single computing device, such as a server connected to the network 18. In some embodiments, the RDMA authentication management system 20 may be implemented on a collection of different hosts, for instance on a collection of different computing devices, as a distributed application including a plurality of different services, such as corresponding to the different modules as described below. Or in some embodiments, the RDMA authentication management system 20 may be executed as an application on one of the computing devices 12, 14, or 16 participating in RDMA sessions.

In some embodiments, the RDMA authentication management system 20 includes a risk assessment module 44, a credential validator 48, an authentication token generator 50, a permissions repository 46, and an access log 52. In some embodiments, these components may communicate with one another to effectuate the various features of the RDMA authentication management system 20 described above.

In some embodiments, the risk assessor 44 is configured to determine a risk score for a requested session of RDMA access. In some cases, this may include receiving a user credential or user identifier of a requesting device, a user credential or other user identifier of a device having the memory to which access is requested, a type of access request (e.g. read, write, a portion of memory (such as ident process identifier of an application to which the portion of memory for which access is requested is assigned), and computing device attribute identifiers, such as hardware and software fingerprints of the requesting computing device and a device for which access is requested. Some embodiments may calculate a risk or plurality of risk scores based on each of these factors s or various subsets of these factors. In some embodiments, these risk scores may be compared to a threshold to determine whether to permit the requested access, to request supplemental authentication (like via a separate channel, such as via a mobile device or with a subsequent password), to permit a subset of the requested access (like limiting the user to read only or to a subset of the regions of memory for which access is requested), or to fully block the requested access. In some cases, various metrics may be determined and weights may be associated with those metrics. In some embodiments, the risk score may be a weighted sum of the various metrics. Examples of the metrics include: an amount of times a given requesting user has previously made requests from a computing device having the computing device attribute indicator or indicators presently presented, a diversity of users (such as a number of users) previously making request with that computing device, an amount of times that a computing device with the computing device attribute indicators has been on the network 18 or has been participating in previous RDMA sessions, similar metrics for the computing device for which access is requested, an amount of change between previous computing device attribute indicators of one of these computing devices at a given Internet protocol address or other network address and computing device attribute indicators and a present request, an amount of data for which access is requested, a type of access request (e.g. read, write, identifier of requesting application, identifier of application assigned to a region of memory for which access is requested) and frequencies with which these attributes have been historically presented in RDMA sessions on the network 18. Some embodiments may execute an anomaly detection algorithm, for instance by forming a session vector with scalars corresponding to each of these metrics for each historical RDMA session and then clustering these session vectors with a density-based clustering algorithm, such as DBSCAN. Some embodiments may then determine whether to permit a subsequent access request by determining whether a current requested session has a vector that is an outlier relative to historical clusters.

Some embodiments may execute a density-based clustering algorithm, like DBSCAN, to establish groups corresponding to the resulting clusters and exclude outliers. To cluster according to session parameters, some embodiments may iterate through each of the session reflected in the records and designate a session vector as a core session vector, if at least a threshold number of the other session vectors in the records are within a threshold distance in the vector space. Some embodiments may then iterate through each of the core session vectors and create a graph of reachable session vectors, where nodes on the graph are identified in response to non-core corresponding session vectors being within a threshold distance of a core session vector in the graph, and in response to core session vectors in the graph being reachable by other core session vectors in the graph, where to session vectors are reachable from one another if there is a path from one session vector to the other session vector where every link and the path is a core session vector and is it within a threshold distance of one another. The set of nodes in each resulting graph, in some embodiments, may be designated as a cluster, and points excluded from the graphs may be designated as outliers that do not correspond to clusters. In some embodiments, the resulting clusters may be a local optimum resulting, and different initial conditions (e.g., different initial point selections) may yield better (e.g., with a smaller sum of root-mean-square distances between centroids and vectors) clusters. Accordingly, some embodiments may repeat the clustering process multiple times (e.g., more than five times) with different initial point selections (e.g., different random selections) and select a resulting set of clusters having the best clusters by the aforementioned measure.

In some embodiments, a binary determination may be made based on various rules, such as criteria stored in policies and the permissions repository 46. For example, in some cases a user, such as a system administrator operating the administrator computing device 19, may specify in a policy stored in the permissions repository 46, white listed pairwise combinations of users, applications, computing devices, or combinations thereof that are permitted to engage in RDMA sessions, or designated types of RDMA sessions. In some embodiments, the criteria may include black listed pairwise combinations of users, applications, computing devices, or combinations thereof that are not permitted to engage in RDMA sessions, or designated types of RDMA sessions. Or in some cases, these rules may specify a metric input into the above-described risk score, or one of the above-described actions corresponding to less than the full scope of the requested access, such as limiting the user to read access only, to particular regions of memory associated with particular applications, or requesting subsequent additional authentication factors.

In some embodiments, the permissions repository may be a relational or nonrelational database storing a plurality of policies, such as policies including various criteria, like the above-described weights used to determine scores compared to thresholds or the above-describes rules. In some embodiments, the policies may further include thresholds for risk scores, such as the plurality a threshold corresponding to various forms of responsive action, like emitting an alarm, limiting access to a particular type of RDMA access, or permitting full requested RDMA access. In some embodiments, the RDMA authentication management system 20 may be a multi-tenant implementation in which different sets of tenants have different permissions corresponding to different networks that are managed. In some embodiments, the permissions may further include a plurality of user accounts identifying roles and permissions of various users, which in some cases may be mapped to the above-described criteria in the policies, for instance, with criteria indicating that users having above a threshold rank, or users having a white listed list of job titles are prohibited or permitted in engaging in various types of RDMA sessions. Further, user accounts may also indicate roles and permissions that are enforced by the RDMA authentication management system 20 with respect to configuration of policies and access to the logged records, for instance, designating certain users as administrators and granting those users the ability to change policies or access logged records. In some embodiments, the RDMA authentication management system 20 may cause user interfaces to be presented on the administered computing device 19 by which policies are changed, user chat accounts are configured, and access logs are reviewed. In some embodiments, this may include executing the RDMA authentication management system 20 on the administered computing device 19 and instructing, via an operating system, a display of the administrator computing device 19 to present user interface and receive input. Or in some cases, this may include sending instructions to a web browser executing on the administered computing device 19, via the network 18, causing the web browser to present the user interfaces and receive input from the user and send the input back to the RDMA authentication management system 20.

In some embodiments, the RDMA authentication management system 20 includes a credential validator 28, which may be configured to receive a user credential associated with a request to initiate an RDMA session. The received user credential may be received with the request or in a subsequent exchange, for example in response to a request for the credential. In some embodiments, the credential may be entered into a user interface on the application 34, accessed in memory of the computing device 12, or otherwise retrieved from the computing device 12 or another computing device, e.g., via a side channel, like via a request to a mobile computing device associated with the user logged into the computing device 12. In some cases, the received user credential is received in the form of a value demonstrating possession of a user credential, such as a ciphertext signed with a private key of a user in a asymmetric encryption protocol, such as RSA or various forms of public-key encryption. In some embodiments, the credential validator 48 may access a public key associated with the user. Example of such is associated with the user identifier sent with the RDMA session, request of the user credential or value to mistreating possession of the user credential, and verify with the public key that the received value demonstrating possession of the user credential was signed by a computing device with access to the private key corresponding to that public cryptographic key. Or in some cases, the credential may be a one-time password, such as the various types of one-time passwords described above, and the credential validator 48 may make a binary determination of whether the received credential is valid, for instance matches a public-key or other value stored in a user account associated with an identified user in the permissions repository 46.

Upon determining that a user is too high of risk or that their credentials are not valid, some embodiments may log a failed access request in the access log 52 and in some cases emitting an alarm, such as sending a message to the administrator computing device 19, sending a text message, sending an email, or the like, for an example, sending an email to an email address associated with a particular role, such as that of a system administrator designated as being on duty in a user account.

Alternatively, upon determining that the credentials are valid and the request is sufficiently low risk, some embodiments may engage the authentication token generator 50 to generate an authentication token. In some cases, the authentication token may be a random string of sufficiently high entropy, such as longer than 128 or 256 bytes, that the token is computationally prohibitive to brute force. In some embodiments, the authentication token includes a plurality of different values, such as a random string, and key value pairs designating various forms of authenticated access, such as listing a pair of computing devices, users and applications permitted to communicate with the authentication token. In some embodiments, the authentication token may include these values in an encrypted or cryptographically signed ciphertext that serves as the authentication token. In some cases, the authentication token may be sent as a single value to a computing device, such as in a single message, or in some cases, the authentication token may be sent over multiple exchanges. In some cases, the authentication token may include a plurality of the above-described values imposing various constraints on the permitted RDMA session in a string that is signed, for example by calculating a cryptographic hash of the set of instructions and encrypting the cryptographic hash with a private key in a public-key encryption protocol of the RDMA authentication management system 20. The computing devices 12 may receive this signed value, verify that the cryptographic hash is signed by an entity with access to the private key with a public-key of the RDMA authentication management system 20 stored in memory of one of the computing devices, verify that the signed cryptographic hash is consistent with the received configuration of permitted form of the RDMA session (for instance by recalculating the cryptographic cash with the received configuration and determining that they match). Upon determining that the authentication token is valid, some embodiments permit the RDMA session to proceed or, alternatively upon determining that the authentication token is not valid, for instance has been modified, block the RDMA session.

In some embodiments, the RDMA agents 32 may receive the authentication token, attach the authentication token or value to mistreating possession of the authentication token to RDMA requests, and determine whether to process the RDMA requests based on this value or the authentication token itself In some embodiments, the RDMA agents may interface with the operating system and the firmware 42 to configure the RDMA sessions, for instance responsive to the authentication token or corresponding value being determined to be valid and consistent with configuration constraints therein. In some embodiments, this may include determining whether to establish a protection domain, determining whether to register an RDMA session to an area of memory in a protection domain, determining whether to permit access request to a registered area of memory, or determining whether to permit a particular type of access request to a registered area of memory.

Figure 2:
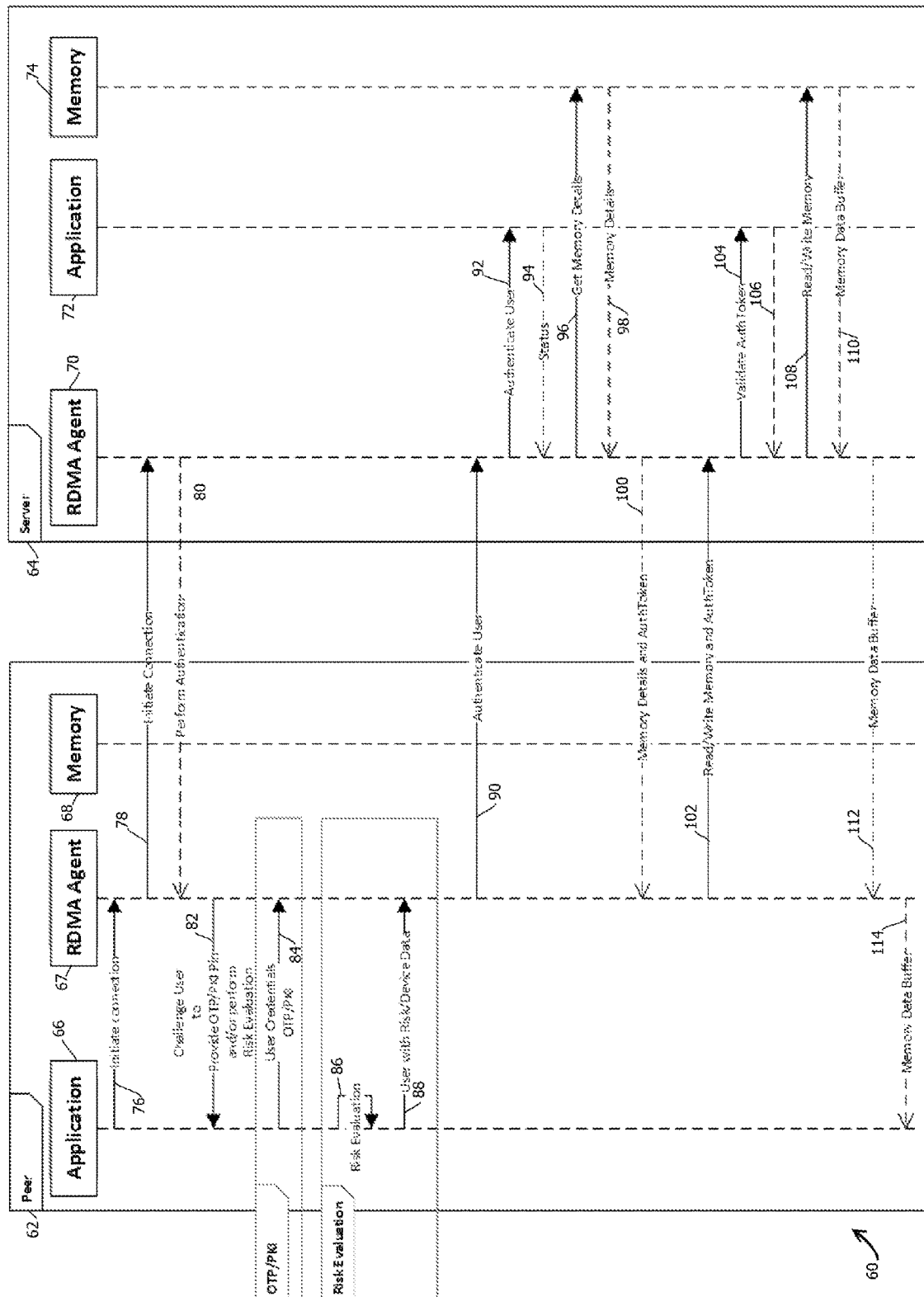
FIG. 2 is a flowchart showing an example of a process by which an RDMA session may be authorized and conducted between a pair of computing devices in accordance with some embodiments of the present techniques.

FIG. 2 shows a flowchart of a process by which an RDMA session may be authorized and conducted in accordance with some embodiments. In some embodiments, the process 60 and the other processes described herein may be implemented by executing instructions stored on a tangible, non-transitory, machine-readable medium, for instance with one or more processors. In some embodiments, the medium may be distributed, for instance with different instructions executed by different processors stored on different bodies of media, an arrangement consistent with use of the singular term medium herein. In some embodiments, these and other operations described herein may be executed in a different order, may be repeated, may have instructions that are omitted, may have instructions that are executed concurrently, and may have instructions that are executed sequentially, none of which is to suggest that any other feature described herein is limiting.

In some embodiments, the process 60 includes operations performed by two different computing devices 62 and 64, in this case labeled peer and server, respectively. In some cases, communications may be peer to peer or in a client/server architecture. In some embodiments, each of the computing devices 62 and 64 may have the features of the computing device 12, 14, and 16 described above.

In some embodiments, the computing device 62 may include an application 66, an RDMA agent 67, and system memory 68. In some embodiments, computing device 64 may include an RDMA agent 70, an application 72, and system memory 74. In some embodiments, the application 72 may be a server application, and the application 66 may be a client application in a client-servant server architecture of a distributed application. In some embodiments, the process 60 includes the application 66 requesting the RDMA agent 67 to initiate a connection via RDMA with another computing device, as indicated by block 76 in some cases, this may include calling an RDMA driver registered in the operating system of the computing device 62. The RDMA agent 67 may then send a request to initiate an RDMA connection in an RDMA session, as indicated by block 78, to the RDMA agent 70 on the computing device 64, for instance via the network 18 described above. The RDMA agent 70 may respond, as indicate by communication 80, by sending a message to the computing device 60 instructing the RDMA agent 67 to perform one or more of the above-described authentication routines, for instance upon determining that the request to initiate the connection and communication 78 does not correspond to an already authenticated RDMA session, for instance upon determining that it is not associated with an authentication token.

In response the RDMA agent 67 may communicate to the application 66 a challenge to the user to provide a user credential, such as a one-time password, a public-key infrastructure pin number, and to perform a risk evaluation, as indicated by communication 80. This may cause the application 66 to send a request to the above-described RDMA authentication management system 20, which may execute the process of FIG. 3 or the other operations described above to obtain a user credential, or by demonstrating possession of the user credential, and obtain the computing device attribute indicators described above. In some embodiments, the RDMA authentication management system 20 may respond by issuing an authentication token to the computing device 62, which may then supply the authentication token to the server 64 to effectuate an RDMA session.

Or in some embodiments, the user credential (or value demonstrating possession thereof) and the computing device attribute indicators, along with a user identifier, may be provided to the computing device 64 via the RDMA agent 67, as indicated by communications 82, 84, 86, 88, and 90.

Next, for instance in embodiments in which authentication is requested by the computing device 64 based on information supplied by the computing device 62, the RDMA agent 70 may advance received information related to authentication to the application 72, as indicated by communication 92. In some embodiments, the application 72 may then send a request to the above-described RDMA authentication management system 22, authenticate the user, determine whether the requested RDMA session is authorized, and receive an authentication token upon a positive determination. In some embodiments, the resulting authentication token, and cases where the requested RDMA session is authorized, may be sent back to the application 72, and the application 72 may communicate the status, for instance with the authorization token to the RDMA agent 70 in communication 94. Next, in some embodiments, the RDMA agent may obtain memory details from memory 74 related to the requested RDMA session, as indicated in communication 96. In some cases, this may include obtaining a protection domain or creating a protection domain, obtaining a registered area of memory in a protection domain, or registering an area for memory in the protection domain for access in the requested RDMA session. The corresponding memory details, in some cases, and an identifier of a protection domain and registered area within the protection main associated with the requested RDMA session, may be communicated back to the RDMA agent 70, for instance in communication 98.

Next, the RDMA agent 70 may send the obtained memory details and the authorization token to the RDMA agent 67 of computing device 62, for instance in communication 100. In some embodiments, the RDMA session may then be initiated, for instance, with the request from the RDMA agent 67 to the RDMA agent 70 to read or write to memory, for instance in a request containing or associated with the authorization token, for instance, as indicated in communication 102. In some embodiments, the request may be cryptographically signed with the authorization token, or a value based on the authorization token, such as a private cryptographic key, or in some embodiments, the request may be otherwise encrypted, for instance with transport layer security encryption or with a value in the authorization token. In some embodiments, the specific values written or read may be designated by the application 66 and supplied to the RDMA agent 67.

Upon receiving the read access request in the authorization token from communication 102, the RDMA agent 70 and computing device 64 may then validate the associated authorization token, as indicated by communications 104 and 106, to the application 72. In some embodiments, this may include sending the authorization token back to the RDMA authentication management system 20 for validation, or some embodiments may compare the authorization token to a value, such as the authorization token itself, stored in memory of the application 72 to determine that the values match. Upon determining that the authorization token is valid, and in some cases upon determining that the authorization token is consistent with the scope of the access request and communication 102, e.g., satisfies the various types of constraints on different types of access request described above, some embodiments may communicate to the RDMA agent 70 from the application 72 that the requested access is permitted. In some embodiments a communication describing the requested access may also be sent to the RDMA authentication management system 20 for logging in the access log 52.

Or in some cases, upon determining that the authorization token is not valid or that the scope of access is greater than that permitted by the authorization token, some embodiments may block the access request, and in some cases send an error message back to the computing device 62.

Some embodiments may then cause the RDMA agent 70 to effectuate remote direct memory access in accordance with the request in the memory 74, as indicated by communications 108 and 110 between the RDMA agent 70 and the memory 74. In some embodiments, the communication may be made via an instance of firmware executing in a network adapter that reads the data from the memory 74 or writes data to the memory 74, without a subsequent interrupt, context switch core, or further communication via the networking stack of the kernel of the operating system of the computing device 64, to effectuate the requested access.

In some embodiments, read data, or confirmation that a right was completed, may be returned in communication 112, for instance either via the RDMA agent 70 or via a network adapter at the instruction of the RDMA agent 70, and some cases without further intervention by the RDMA agent 70 after authorizing the network adapter to effectuate the requested access.

In some embodiments, the return data may be provided by the RDMA agent 72 to the application 66, as indicated in block 114. In some embodiments, the provision of data to the application 66 may also be via RDMA, or some embodiments may provide the data to the application 66 via a traditional kernel networking stack of an operating system of the computing device 62.

Figure 3:
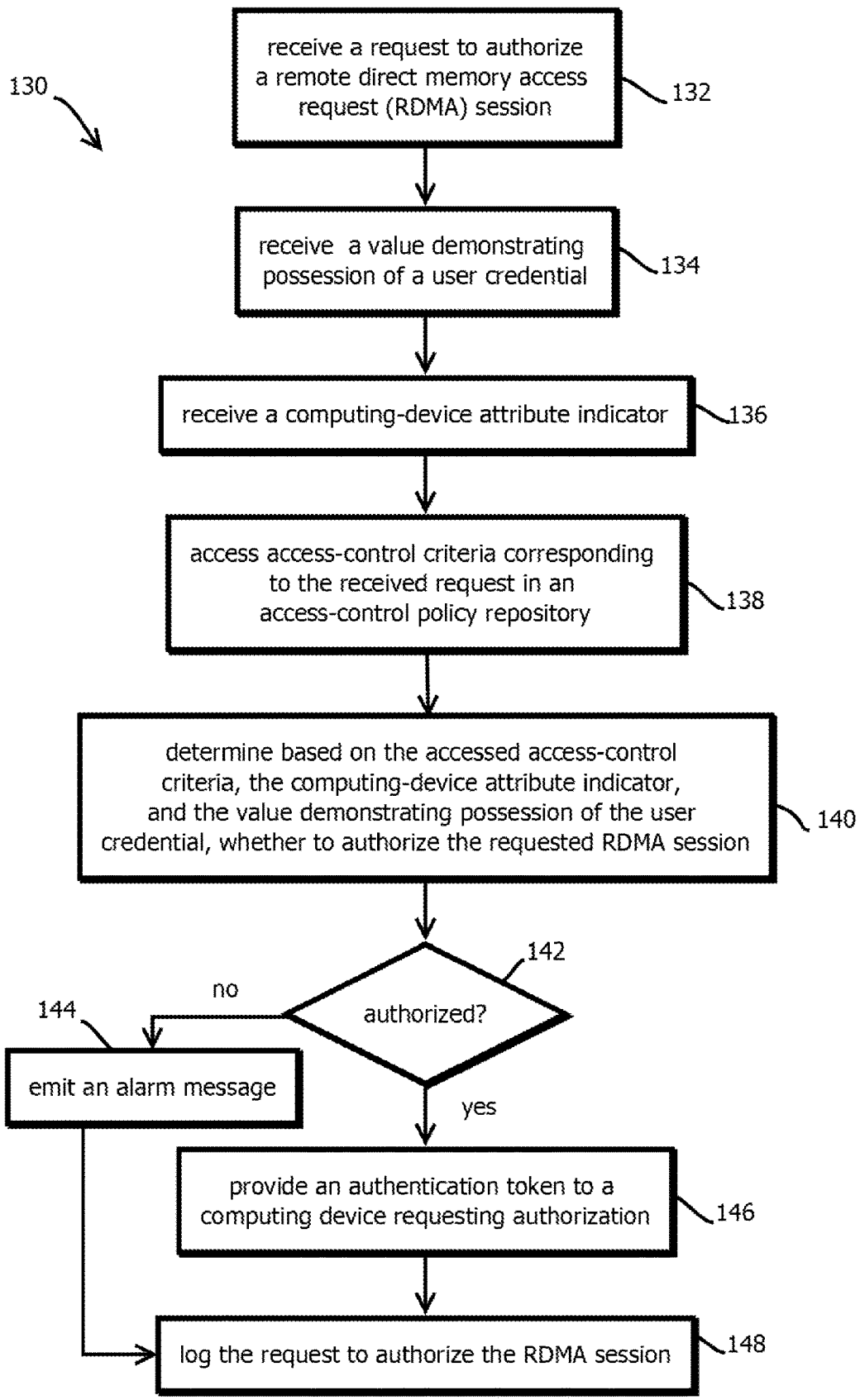
FIG. 3 shows is a flowchart showing an example of a process by which a request for an RDMA session may be determined to be authorized or not authorized in accordance with some embodiments of the present techniques.

FIG. 3 shows an example of a process 130 that may be implemented by the RDMA authentication management system 20 described above to authorize an RDMA session. In some embodiments, the process 130 may include receiving a request to authorize a remote direct memory access request session, as indicated by block 132. Next, some embodiments may receive a value demonstrating possession of a user credential, as indicated by block 134, and receive a computing-device attribute indicator, as indicated by block 136. In some embodiments, the computing-device attribute indicator may be a single hash value based on a plurality of different attributes of a computing device, or a set of key value pairs of different attributes, or a set of different cryptographic hash values based on such attributes. Examples of cryptographic hash functions include MD5 cryptographic hash functions, SHA 256 cryptographic hash functions, and the like. Next, some embodiments may access access-controlled criteria corresponding to the received request in an access-controlled policy repository, as indicated by block 138. In some embodiments, this may include determining which rules and various other criteria and the permissions repository 46 of FIG. 1 apply to the request, for instance corresponding to a tenant, user, computing device, and type of access requested.

Next, some embodiments may determine based on the accessed access-controlled criteria, the computing-device attribute indicator, and the value demonstrating possession of the user credential, whether to authorize the requested RDMA session, as indicated by block 140. In some embodiments, this may include making one of the above-described determinations by which a more limited form of access is granted, an additional authentication factor is obtained, or the requested access is denied. Different actions may be taken depending upon whether the request is determined to be authorize, as indicated by block 142.

Upon determining that the requested axis is not authorize, some embodiments may include emitting an alarm message, as indicated by block 144 and log the request and results of the determination to a log, as indicated by block 148, such as to the axis log 52 described above. Alternatively, upon determining that the request is authorize, some embodiments may provide an authentication token to a computing device requesting authorization, as indicated by block 146.

Figure 4:
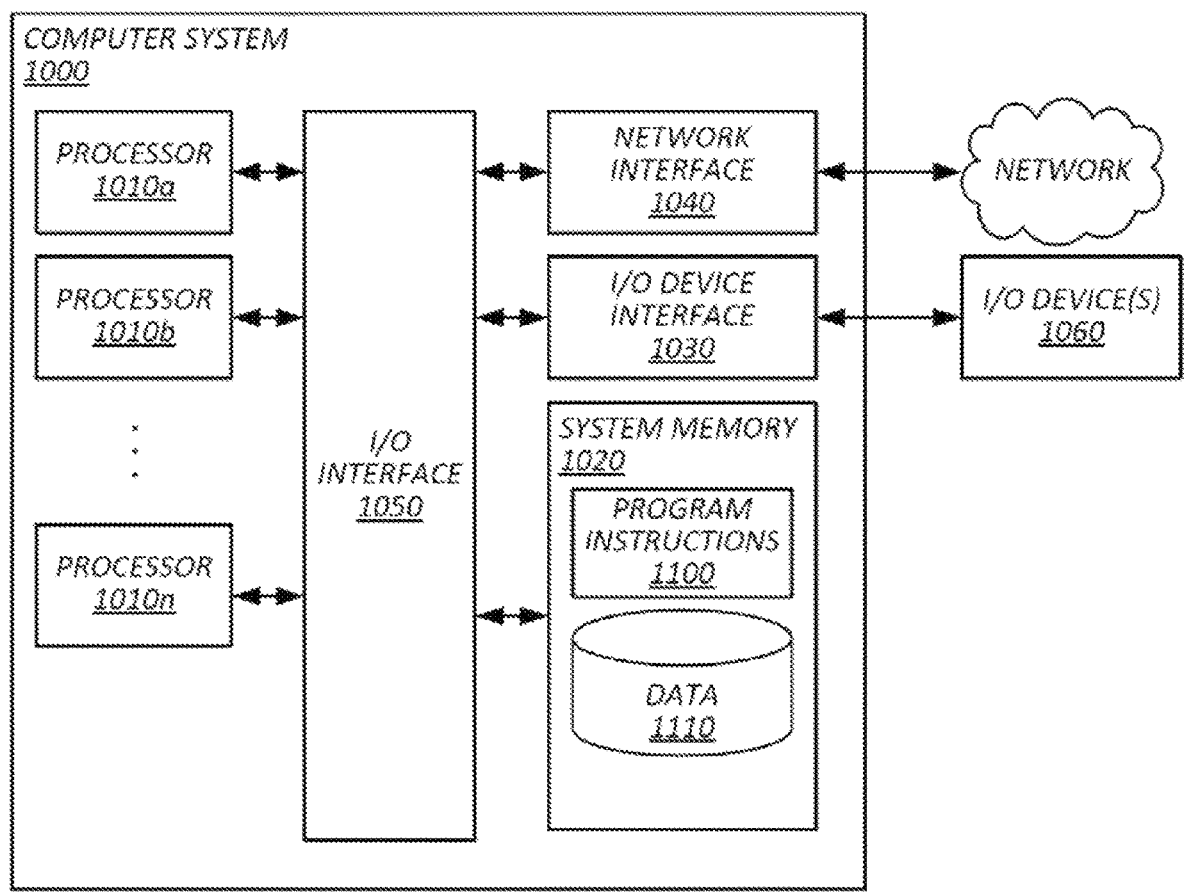
FIG. 4 shows an example of a computing device by which the present techniques may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method of determining whether remote direct memory access requests are authorized, the method comprising: receiving, with one or more processors, via a network, a request to authorize a remote direct memory access request (RDMA) session between a first computing device and a second computing device, wherein: the RDMA session implements an RDMA protocol by which data is made accessible in system memory of the first computing device to the second computing device, the data is made accessible through direct memory access to the system memory by firmware executing on a network adapter of the first computing device responsive to access requests received from the second computing device by the network adapter, and the direct memory access is performed by the first computing device without corresponding access requests first being processed by a networking stack of a kernel of an operating system of the first computing device; receiving, with one or more processors, via a network, a value demonstrating possession of a user credential, the value demonstrating possession of the user credential being received in association with the request to authorize the RDMA session, the user credential being supplied via an application executing on the second computing device; receiving, with one or more processors, via a network, a computing-device attribute indicator based on a plurality attributes of the second computing device, wherein at least one attribute among the plurality of attributes is an immutable value at least partially identifying hardware of the second computing device; accessing, with one or more processors, access-control criteria corresponding to the received request in an access-control policy repository, wherein: the access-control policy repository contains criteria corresponding to a plurality of different users including a user authorized to be authenticated with the user credential, the access-control policy repository contains criteria indicating that at least some pairs of computing devices on a network are not permitted to conduct an RDMA session, and the access-control policy repository contains criteria indicating that at least some combinations of users and pairs of the computing devices are not permitted to conduct an RDMA session; determining, with one or more processors, based on the accessed access-control criteria, the computing-device attribute indicator, and the value demonstrating possession of the user credential, to authorize the requested RDMA session; and in response to the determination, causing, with one or more processors, an authentication token to be provided to the first computing device, the authentication token being configured to cause the first computing device to permit the second computing device to conduct an RDMA session with the first computing device.

2. The method of embodiment 1, wherein: the determination is based on multi-factor authentication of the user of the second computing device based, at least in part, on the value demonstrating possession of the user credential; the determination is based on a risk score calculated based on the plurality attributes of the second computing device and one or more attributes of the first computing device; and a result of the determination is stored in a log accessible to an administrator computing device.

3. The method of any one of embodiments 1-2, wherein the value demonstrating possession of the user credential is based on one or more of the following: a password that remains static over multiple sessions and at least one week, a private cryptographic key corresponding to a public cryptographic key of a user operating the second computing device, the public cryptographic key being used in the determination to validate that the value demonstrating possession of the user credential was provided by a computing device with access to the private cryptographic key; or a dynamically generated one-time password that is not valid across different sessions more than a day apart.

4. The method of any one of embodiments 1-3, wherein: the computing-device attribute indicator is based on a medium access control (MAC) identifier of a network adapter of the second computing device; and the RDMA session is conducted via an Ethernet connection including a first point-to-point full duplex connection to the first computing device and a second point-to-point full duplex connection to the second computing device.

5. The method of any one of embodiments 1-4, wherein the computing-device attribute indicator includes one or more cryptographic hash values calculated based on two or more of the following: a medium access control (MAC) identifier or global unit identifier (GUID) of a network adapter of the second computing device; a volume identifier of a non-volatile storage device of the second computing device; a processor identifier of the second computing device; a central processing unit identifier of the second computing device; one or more attributes of a central processing unit of the second computing device; one or more attributes of a Basic Input/Output System (BIOS) or Unified Extensible Firmware Interface (UEFI) of the second computing device; one or more attributes of a motherboard of the second computing device; one or more immutable attributes of random access memory of the second computing device; an Internet Protocol address of the second computing device; a network host identifier of the second computing device; or one or more attributes of an operating system of the second computing device.

6. The method of embodiment 5, wherein: one of the accessed criteria indicates a user authorized to use the user credential has been previously associated with a computing device configured to produce the one or more cryptographic hash values.

7. The method of any one of embodiments 1-6, wherein: the value demonstrating possession of the user credential is based on each of the following: a password that remains static over multiple sessions and at least one week; a private cryptographic key corresponding to a public cryptographic key of a user operating the second computing device, the public cryptographic key being used in the determination to validate that the value demonstrating possession of the user credential was provided by a computing device with access to the private cryptographic key; and a dynamically generated one-time password that is not valid across different sessions more than a day apart; and the computing-device attribute indicator includes a hash value calculated based on each of the following: a medium access control (MAC) identifier or global unit identifier (GUID) of a network adapter of the second computing device; a volume identifier of a non-volatile storage device of the second computing device; a processor identifier of the second computing device; a central processing unit identifier of the second computing device; one or more attributes of a central processing unit of the second computing device; one or more attributes of a Basic Input/Output System (BIOS) or Unified Extensible Firmware Interface (UEFI) of the second computing device; one or more attributes of a motherboard of the second computing device; one or more immutable attributes of random access memory of the second computing device; an Internet Protocol address of the second computing device; a network host identifier of the second computing device; and one or more attributes of an operating system of the second computing device.

8. The method of any one of embodiments 1-7, wherein the determination comprises: determining, based on one of the accessed access-control criteria and the computing-device attribute indicator, to require a second authentication factor; in response to determining to require the second authentication factor, sending a message to a computing device associated with the user credential indicating that the second authentication factor is required; receiving another value demonstrating that the requirement of second authentication factor is satisfied.

9. The method of any one of embodiments 1-8, comprising: receiving a command from an administrator computing device to modify a given criterion in the access-control policy repository; and updating the access-control policy repository to apply the modified criterion to future authorization requests, wherein: the modified criterion specifies that a designated user is authorized to interact with an designated application that participates in an RDMA session between a computing device having a first designated Internet Protocol address and executing the designated application and another computing device having a second designated Internet Protocol address.

10. The method of any one of embodiments 1-9, wherein: the value demonstrating possession of the user credential and the computing-device attribute indicator are received from an RDMA agent executing within an operating system of the second computing device, wherein the RDMA agent includes or is configured to interface with an RDMA driver by which a kernel of the operating system instructs the network adapter of the second computing device to conduct the requested RDMA session.

11. The method of any one of embodiments 1-10, wherein: the authentication token is provided to the first computing device; the first computing device provides the authentication token to the second computing device; the second computing device includes the authentication token in subsequent RDMA access requests; and the first computing device determines whether to execute the subsequent RDMA access requests based on whether the subsequent RDMA access requests include the authentication token.

12. The method of any one of embodiments 1-11, wherein: at least some exchanges between the first computing device and the second computing device associated with the requested RDMA session are encrypted or cryptographically signed with a cyphertext based on the authentication token.

13. The method of any one of embodiments 1-12, wherein: the authentication token includes a cryptographically signed value that is calculated based on a private cryptographic key of an RDMA authentication management system; and the cryptographically signed value is sent to an RDMA agent executing on the first computing device and configured to determine that the cryptographically signed value was cryptographically signed by a computing device with access to the private cryptographic key based on a public cryptographic key associated with the authentication management system in memory of the RDMA agent.

14. The method of any one of embodiments 1-13, comprising: receiving the authentication token with an RDMA agent executing on the first computing device; and in response to receiving the authentication token, with the RDMA agent, registering memory addresses in a memory protection domain of the first computing device as assigned to the requested RDMA session with both the network adapter of the first computing device and the operation system of the first computing device.

15. The method of any one of embodiments 1-14, comprising: executing a first RDMA agent on the first computing device and a first application configured to interface with the first RDMA agent to effectuate the requested RDMA session; executing a second RDMA agent on the second computing device and a second application configured to interface with the second RDMA agent to effectuate the requested RDMA session; and responsive to the determination, reading data from system memory of the first computing device responsive to an RDMA access request from the second computing device without a context switch in the operating system of the first computing device directly caused by receipt of the RDMA access request by the network adapter of the first computing device.

16. A tangible, non-transitory, machine-readable medium storing instructions that when executed by a data processing apparatus cause the data processing apparatus to perform operations comprising: the operations of any one of embodiments 1-16.

17. A system, comprising: one or more processors; and memory storing instructions that when executed by the processors cause the processors to effectuate operations comprising: the operations of any one of embodiments 1-16.

What is claimed is:

1. A method of determining whether remote direct memory access requests are authorized, the method comprising:
    receiving, with one or more processors, via a network, a request to authorize a remote direct memory access request (RDMA) session between a first computing device and a second computing device, wherein:
        the RDMA session implements an RDMA protocol by which data is made accessible in system memory of the first computing device to the second computing device,
        the data is made accessible through direct memory access to the system memory by firmware executing on a network adapter of the first computing device responsive to access requests received from the second computing device by the network adapter, and
        the direct memory access is performed by the first computing device without corresponding access requests first being processed by a networking stack of a kernel of an operating system of the first computing device;
    receiving, with one or more processors, via a network, a value demonstrating possession of a user credential, the value demonstrating possession of the user credential being received in association with the request to authorize the RDMA session, the user credential being supplied via an application executing on the second computing device;
    receiving, with one or more processors, via a network, a computing-device attribute indicator based on a plurality attributes of the second computing device, wherein at least one attribute among the plurality of attributes is an immutable value at least partially identifying hardware of the second computing device;
    accessing, with one or more processors, access-control criteria corresponding to the received request in an access-control policy repository, wherein:
        the access-control policy repository contains criteria corresponding to a plurality of different users including a user authorized to be authenticated with the user credential,
        the access-control policy repository contains criteria indicating that at least some pairs of computing devices on a network are not permitted to conduct an RDMA session, and
        the access-control policy repository contains criteria indicating that at least some combinations of users and pairs of the computing devices are not permitted to conduct an RDMA session;
    determining, with one or more processors, based on the accessed access-control criteria, the computing-device attribute indicator, and the value demonstrating possession of the user credential, to authorize the requested RDMA session; and
    in response to the determination, causing, with one or more processors, an authentication token to be provided to the first computing device, the authentication token being configured to cause the first computing device to permit the second computing device to conduct an RDMA session with the first computing device.

2. The method of claim 1, wherein:
    the determination is based on multi-factor authentication of the user of the second computing device based, at least in part, on the value demonstrating possession of the user credential;
    the determination is based on a risk score calculated based on the plurality attributes of the second computing device and one or more attributes of the first computing device; and
    a result of the determination is stored in a log accessible to an administrator computing device.

3. The method of claim 1, wherein the value demonstrating possession of the user credential is based on one or more of the following:
    a password that remains static over multiple sessions and at least one week,
    a private cryptographic key corresponding to a public cryptographic key of a user operating the second computing device, the public cryptographic key being used in the determination to validate that the value demonstrating possession of the user credential was provided by a computing device with access to the private cryptographic key; or
    a dynamically generated one-time password that is not valid across different sessions more than a day apart.

4. The method of claim 1, wherein:
the computing-device attribute indicator is based on a medium access control (MAC) identifier of a network adapter of the second computing device; and
the RDMA session is conducted via an Ethernet connection including a first point-to-point full duplex connection to the first computing device and a second point-to-point full duplex connection to the second computing device.

5. The method of claim 1, wherein the computing-device attribute indicator includes one or more cryptographic hash values calculated based on two or more of the following:
a medium access control (MAC) identifier or global unit identifier (GUID) of a network adapter of the second computing device;
a volume identifier of a non-volatile storage device of the second computing device;
a processor identifier of the second computing device;
a central processing unit identifier of the second computing device;
one or more attributes of a central processing unit of the second computing device;
one or more attributes of a Basic Input/Output System (BIOS) or Unified Extensible Firmware Interface (UEFI) of the second computing device;
one or more attributes of a motherboard of the second computing device;
one or more immutable attributes of random access memory of the second computing device;
an Internet Protocol address of the second computing device;
a network host identifier of the second computing device; or
one or more attributes of an operating system of the second computing device.

6. The method of claim 5, wherein:
one of the accessed criteria indicates a user authorized to use the user credential has been previously associated with a computing device configured to produce the one or more cryptographic hash values.

7. The method of claim 1, wherein:
the value demonstrating possession of the user credential is based on each of the following:
a password that remains static over multiple sessions and at least one week;
a private cryptographic key corresponding to a public cryptographic key of a user operating the second computing device, the public cryptographic key being used in the determination to validate that the value demonstrating possession of the user credential was provided by a computing device with access to the private cryptographic key; and
a dynamically generated one-time password that is not valid across different sessions more than a day apart; and
the computing-device attribute indicator includes a hash value calculated based on each of the following:
a medium access control (MAC) identifier or global unit identifier (GUID) of a network adapter of the second computing device;
a volume identifier of a non-volatile storage device of the second computing device;
a processor identifier of the second computing device;
a central processing unit identifier of the second computing device;
one or more attributes of a central processing unit of the second computing device;
one or more attributes of a Basic Input/Output System (BIOS) or Unified Extensible Firmware Interface (UEFI) of the second computing device;
one or more attributes of a motherboard of the second computing device;
one or more immutable attributes of random access memory of the second computing device;
an Internet Protocol address of the second computing device;
a network host identifier of the second computing device; and
one or more attributes of an operating system of the second computing device.

8. The method of claim 1, wherein the determination comprises:
determining, based on one of the accessed access-control criteria and the computing-device attribute indicator, to require a second authentication factor;
in response to determining to require the second authentication factor, sending a message to a computing device associated with the user credential indicating that the second authentication factor is required;
receiving another value demonstrating that the requirement of second authentication factor is satisfied.

9. The method of claim 1, comprising:
receiving a command from an administrator computing device to modify a given criterion in the access-control policy repository; and
updating the access-control policy repository to apply the modified criterion to future authorization requests, wherein:
the modified criterion specifies that a designated user is authorized to interact with an designated application that participates in an RDMA session between a computing device having a first designated Internet Protocol address and executing the designated application and another computing device having a second designated Internet Protocol address.

10. The method of claim 1, wherein:
the value demonstrating possession of the user credential and the computing-device attribute indicator are received from an RDMA agent executing within an operating system of the second computing device, wherein the RDMA agent includes or is configured to interface with an RDMA driver by which a kernel of the operating system instructs the network adapter of the second computing device to conduct the requested RDMA session.

11. The method of claim 1, wherein:
the authentication token is provided to the first computing device;
the first computing device provides the authentication token to the second computing device;
the second computing device includes the authentication token in subsequent RDMA access requests; and
the first computing device determines whether to execute the subsequent RDMA access requests based on whether the subsequent RDMA access requests include the authentication token.

12. The method of claim 1, wherein:
at least some exchanges between the first computing device and the second computing device associated with the requested RDMA session are encrypted or cryptographically signed with a cyphertext based on the authentication token.

13. The method of claim 1, wherein:
the authentication token includes a cryptographically signed value that is calculated based on a private cryptographic key of an RDMA authentication management system; and
the cryptographically signed value is sent to an RDMA agent executing on the first computing device and configured to determine that the cryptographically signed value was cryptographically signed by a computing device with access to the private cryptographic key based on a public cryptographic key associated with the authentication management system in memory of the RDMA agent.

14. The method of claim 1, comprising:
receiving the authentication token with an RDMA agent executing on the first computing device; and
in response to receiving the authentication token, with the RDMA agent, registering memory addresses in a memory protection domain of the first computing device as assigned to the requested RDMA session with both the network adapter of the first computing device and the operation system of the first computing device.

15. The method of claim 1, wherein:
the determination comprises steps for determining whether an RDMA session is authorized.

16. The method of claim 1, comprising:
executing a first RDMA agent on the first computing device and a first application configured to interface with the first RDMA agent to effectuate the requested RDMA session;
executing a second RDMA agent on the second computing device and a second application configured to interface with the second RDMA agent to effectuate the requested RDMA session; and
responsive to the determination, reading data from system memory of the first computing device responsive to an RDMA access request from the second computing device without a context switch in the operating system of the first computing device directly caused by receipt of the RDMA access request by the network adapter of the first computing device.

17. A tangible, non-transitory, machine-readable medium storing instructions that when executed by one or more processors effectuate operations comprising:
receiving, with one or more processors, via a network, a request to authorize a remote direct memory access request (RDMA) session between a first computing device and a second computing device, wherein:
the RDMA session implements an RDMA protocol by which data is made accessible in system memory of the first computing device to the second computing device,
the data is made accessible through direct memory access to the system memory by firmware executing on a network adapter of the first computing device responsive to access requests received from the second computing device by the network adapter, and
the direct memory access is performed by the first computing device without corresponding access requests first being processed by a networking stack of a kernel of an operating system of the first computing device;
receiving, with one or more processors, via a network, a value demonstrating possession of a user credential, the value demonstrating possession of the user credential being received in association with the request to authorize the RDMA session, the user credential being supplied via an application executing on the second computing device;
receiving, with one or more processors, via a network, a computing-device attribute indicator based on a plurality attributes of the second computing device, wherein at least one attribute among the plurality of attributes is an immutable value at least partially identifying hardware of the second computing device;
accessing, with one or more processors, access-control criteria corresponding to the received request in an access-control policy repository, wherein:
the access-control policy repository contains criteria corresponding to a plurality of different users including a user authorized to be authenticated with the user credential,
the access-control policy repository contains criteria indicating that at least some pairs of computing devices on a network are not permitted to conduct an RDMA session, and
the access-control policy repository contains criteria indicating that at least some combinations of users and pairs of the computing devices are not permitted to conduct an RDMA session;
determining, with one or more processors, based on the accessed access-control criteria, the computing-device attribute indicator, and the value demonstrating possession of the user credential, to authorize the requested RDMA session; and
in response to the determination, causing, with one or more processors, an authentication token to be provided to the first computing device, the authentication token being configured to cause the first computing device to permit the second computing device to conduct an RDMA session with the first computing device.

18. The medium of claim 17, wherein:
the determination is based on multi-factor authentication of the user of the second computing device based, at least in part, on the value demonstrating possession of the user credential;
the determination is based on a risk score calculated based on the plurality attributes of the second computing device and one or more attributes of the first computing device; and
a result of the determination is stored in a log accessible to an administrator computing device.

19. The medium of claim 17, wherein the value demonstrating possession of the user credential is based on one or more of the following:
a password that remains static over multiple sessions and at least one week,
a private cryptographic key corresponding to a public cryptographic key of a user operating the second computing device, the public cryptographic key being used in the determination to validate that the value demonstrating possession of the user credential was provided by a computing device with access to the private cryptographic key; or
a dynamically generated one-time password that is not valid across different sessions more than a day apart.

20. The medium of claim 17, wherein the computing-device attribute indicator includes one or more cryptographic hash values calculated based on two or more of the following:
a medium access control (MAC) identifier or global unit identifier (GUID) of a network adapter of the second computing device;

a volume identifier of a non-volatile storage device of the second computing device;

a processor identifier of the second computing device;

a central processing unit identifier of the second computing device;

one or more attributes of a central processing unit of the second computing device;

one or more attributes of a Basic Input/Output System (BIOS) or Unified Extensible Firmware Interface (UEFI) of the second computing device;

one or more attributes of a motherboard of the second computing device;

one or more immutable attributes of random access memory of the second computing device;

an Internet Protocol address of the second computing device;

a network host identifier of the second computing device; or one or more attributes of an operating system of the second computing device.

* * * * *